United States Patent [19]

Hall et al.

[11] Patent Number: 4,946,490

[45] Date of Patent: Aug. 7, 1990

[54] METHOD FOR PREPARING FLUORIDE GLASSES

[75] Inventors: Bruce T. Hall, Groton; Leonard J. Andrews, Wayland; Robert C. Folweiler, Bedford, all of Mass.

[73] Assignee: GTE Laboratories Incorporated, Waltham, Mass.

[21] Appl. No.: 347,304

[22] Filed: May 4, 1989

Related U.S. Application Data

[62] Division of Ser. No. 177,204, Apr. 4, 1988.

[51] Int. Cl.$^5$ .................. C03B 5/225; C03B 5/235; C03C 3/32
[52] U.S. Cl. .................. 65/32.5; 65/134; 65/DIG. 16; 501/40
[58] Field of Search ............. 65/32.5, 134, DIG. 16; 501/40, 37, 904

[56] References Cited

U.S. PATENT DOCUMENTS

4,647,545  3/1987  Lucas .................. 501/904
4,666,870  5/1987  Poulain ................. 501/40

FOREIGN PATENT DOCUMENTS

36373      9/1981  European Pat. Off. ....... 501/40
59-03039   1/1984  Japan .................... 65/DIG. 16
60-27621   2/1985  Japan .................... 501/904
60-155549  8/1985  Japan .................... 501/40

*Primary Examiner*—Kenneth M. Schor
*Attorney, Agent, or Firm*—Frances P. Craig

[57] ABSTRACT

A new, simplified method of fabricating optically transparent fluoride glasses containing $ZrF_4$ and/or $HfF_4$ has been developed which relies on a high vacuum pretreatment for surface dehydration, melting in a rigorously inert argon atmosphere, and incorporation of a nonvolatile metallic oxidant in the melt such as $InF_3$ or $SnF_4$. Previous methods for making these glasses have relied on either addition of ammonium bifluoride into the batch materials, or melting in an oxidizing atmosphere (so-called reactive atmosphere processing or RAP); both of these latter techniques have significant drawbacks.

14 Claims, No Drawings

METHOD FOR PREPARING FLUORIDE GLASSES

This is a divisional of co-pending application Ser. No. 07/177,204 filed on Apr. 4, 1988.

FIELD OF THE INVENTION

This invention relates to a method of preparing a glass. More particularly, this invention relates to a method of preparing a fluoride glass.

BACKGROUND OF THE INVENTION

It was first reported by Poulain et al. in 1975 that the ternary mixture $ZrF_4 \cdot BaF_2 \cdot NaF$ formed a transparent glass when fused at 800° C. instead of a new crystalline laser host material that was the object of their investigation. M. Poulain and J. Lucas, "Verres Fluores au Tetrafluorure de Zirconium. Properties Optiques d'un Verre Dope au $Nd^{3+}$," "Mat. Res. Bull. 10, 243–246 (1975). Their discovery aroused immediate widespread interest because this previously unknown class of fluoride glasses represented the only practical, amorphous material with infrared transparency extending beyond 6 microns. This desirable optical attribute is a direct consequence of the glasses being completely nonoxide in composition and has been the principal reason for the extensive development over the last twelve years.

It was quickly realized that the extended infrared transparency of fluoride glasses could lead to optical fiber waveguides with losses on the order of 0.01–0.001 dB/km, considerably better than the 0.1 dB/km theoretical limit of silica fiber. The operating penalty would be the need to develop transmitters and receivers that operate at 2.5 micrometers rather than at the 1.3/1.55 micrometers communication channels of present-day fibers. Although many technological issues regarding the practicality of fluoride glasses remain to be solved, optical fiber waveguides have been made by several groups with losses near 1 dB/km. The residual loss which so far has prevented these waveguides from attaining intrinsic behavior is due to impurities in the batch starting materials and to scatter associated with glass processing. Without exception, and despite considerable effort to develop alternative compositions, all of the low loss optical work has been done on multicomponent glasses which closely resemble the original Poulain formulation. The principal differences have been the addition of the stabilizing agents $AlF_3$ and $LaF_3$. A typical composition in mole % is 54 $ZrF_4$, 22.5 $BaF_2$, 4.5 $LaF_3$, 3.5 $AlF_3$, 15.5 NaF. $HfF_4$ can be partially substituted for $ZrF_4$ in order to achieve the refractive index difference required for the core glass/cladding glass structure of optical waveguides.

A persistent and, as yet, not completely understood complication associated with $ZrF_4$ glasses is their tendency to form opaque dark regions within the glass even when processed under rigorously controlled laboratory conditions. In a 1985 review of fluoride glass making techniques, M. G. Drexhage, "Preparation and Properties of High Optical Quality Bulk Fluoride Glasses," Abstracts 3rd Int. Sym. on Halide Glasses, June 24–28, 1985, Rennes, France, Drexhage remarked, "Specimens prepared under dry inert atmosphere (Ar or $N_2$) while apparently vitreous, always exhibit a gray tint or black inclusions to some degree, and highlight scattering. This reduction phenomenon has been noted by many workers." This behavior was attributed to the loss of fluorine from the melt at 800° C., effectively chemically reducing $ZrF_4$.

The reduced species are known to be darkly colored solids. Recently, $ZrF_4$ glasses were deliberately reduced by melting in a zirconium metal crucible to generate black regions. The darkening is attributed to reduced zirconium which is at least partially comprised of $Zr^{3+}$, i.e., $ZrF_3$.

The formation of reduced zirconium amounts to catastrophic failure of the glass for optical purposes; consequently it has been the universal practice of workers in the field to prepare $ZrF_4$ (and $HfF_4$) glasses under oxidizing conditions to circumvent the problem. Oxidation has been accomplished either by adding $NH_4F \cdot HF$ to the starting materials prior to melting or by exposing the melt to gaseous oxidants such as $CCl_4$, $NF_3$, $SF_6$, $CF_4$, and $O_2$, or by doing both.

Above 400° C., $NH_4F \cdot HF$ decomposes and provides a source of fluorine and HF. This decomposition has been used since the earliest years of fluoride glass making to insure that residual oxides in nominally fluorinated starting materials are fully converted to fluorides. It was even an early practice to use oxide starting materials for lack of commercially available pure fluorides (e.g., $ZrO_2$, $La_2O_3$, etc.) and fluorinate in situ with a large excess of $NH_4F \cdot HF$ to produce clear glass. However, the use of $NH_4F \cdot HF$ has several disadvantages. It introduces a source of impurities to the glass, especially transition metals, rare earths, and complex anions (sulphate, phosphate), which are difficult to overcome because of the large amounts of $NH_4F \cdot HF$ that are frequently used. It also causes considerable fuming of the melt as a result of its decomposition to gaseous products, and this in turn leads to loss of starting materials and contamination of the furnace. For these reasons, many workers have tried to abandon $NH_4F \cdot HF$ in favor of more elegant and convenient methods of controlling $ZrF_4$ reduction. The method of choice has invariably been to introduce oxidizing agents into the atmosphere over the melt (dubbed reactive atmosphere processing or RAP) and was first applied to fluoride glasses by M. Robinson, R. C. Pastor, R. R. Turk, D. P. Devor, M. Braunstein, and R. Braunstein, "Infrared Transparent Glasses Derived from the Fluorides of Zr, Th and Ba," Mat. Res. Bull 15, 735–742 (1980), who originally developed the technique for fluoride single crystal growth. $CCl_4$ was used as a RAP agent and was very effective in controlling both zirconium reduction and hydration of the glass by trace amounts of water, according to Reactions (1) and (2),

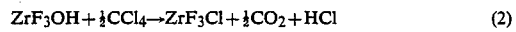

$$ZrF_3OH + \tfrac{1}{4}CCl_4 \rightarrow ZrF_3Cl + \tfrac{1}{4}CO_2 + HCl \qquad (2)$$

Similarly, exposure of the melt to $O_2$ will oxidize reduced zirconium, with formation of zirconyl fluoride as shown in Reaction (3), but unlike $CCl_4$ will not dehydrate the melt.

$$2ZrF_3 + \tfrac{1}{2}O_2 \rightarrow ZrOF_2 + ZrF_4 \qquad (3)$$

Both oxidants have the disadvantage of introducing nonfluoride anions into the glass and both chloride and oxide impurities have been identified as causing glass instability leading to devitrification. In the latter respect, $NF_3$ is a preferred RAP agent because it partially dissociates into atomic fluorine at high temperatures which effectively oxidizes the melt without introducing potential crystal nucleating sites. However, $NF_3$ is a highly corrosive material at the typical melting temperature for fluoride glasses (850° C.), and is quite destructive of furnace elements.

In addition to the complication of reduced zirconium species in fluoride glasses, it is well established that the presence of trace amounts of moisture, either in the melting atmosphere or absorbed onto the batch materials, can lead to glass instability. This is thought to occur through the formation of $ZrOF_2$ at elevated temperatures by reaction (4):

$$ZrF_4 + H_2O \rightarrow ZrOF_2 + 2HF \tag{4}$$

Because of this difficulty with water, several laboratories now process fluoride glasses entirely in inert atmospheres except for the $NH_4F \cdot HF$ and/or RAP steps.

It would clearly be an advance in the field to devise a method for controlling the oxidation state of $ZrF_4/HfF_4$ containing glass melts without the necessity of using RAP and incurring its attendant problems. It would also be highly advantageous to do the melting under moisture free conditions. Recently, a new and improved glass fabrication procedure was developed by us which incorporates these features.

SUMMARY OF THE INVENTION

In accordance with one aspect of the present invention, a new and improved method of preparing a fluoride glass comprises the following steps:

Step 1—An in situ nonvolatile essentially water free metal fluoride oxidant is added to high purity essentially water free starting materials for a fluorozirconate optical glass to form an essentially water free mixture.

Step 2—The essentially water free mixture of Step 1 is melted in a non-reactive atmosphere.

Step 3—The product of Step 2 is cooled to form an optically clear fluoride glass.

In accordance with another aspect of the present invention, a new and improved method of preparing an optically clear fluoride glass comprises the following steps:

Step 1—An in situ nonvolatile essentially water free metal fluoride oxidant is added to high purity essentially water free starting materials for a fluorohafnate optical glass to form an essentially water free mixture.

Step 2—The essentially water free mixture of Step 1 is melted in a non-reactive atmosphere.

Step 3—The product of Step 2 is cooled to form an optically clear fluoride glass.

DETAILED DESCRIPTION OF THE INVENTION

A method for the preparation of a fluorozirconate and/or a fluorohafnate glasses has been invented which permits melting batch components in rigorously inert atmosphere without complications due to the reduction of zirconium or hafnium and without hydration due to moisture desorbed from furnace elements or batch starting components. In particular, the necessity of using reactive atmosphere processing and/or ammonium bifluoride is obviated.

One key element of this new process is the use of an in situ oxidant to control the undesirable reduction of zirconium during glass melting. In one particular example, $InF_3$ is the oxidant which we hypothesize reverses zirconium reduction according to reactions (5), melting, and (6), oxidizing, $$2ZrF_4 \rightarrow 2ZrF_3 + F_2 \text{ (gas)} \tag{5}$$

In reaction (6), $In^{3+}$ is reduced to $In^{1+}$ with a concomitant change in electronic configuration from $[Kr] 4d^{10}$ to $[Kr] 4d^{10}5s^2$. Both oxidation states are expected to be completely transparent to visible and infrared radiation, so the change in oxidation state will not alter the optical properties of the glass. This role of $InF_3$ in the melt was unexpected. The high purity essentially water free starting materials for one of the fluorozirconate glass compositions is listed below:

|      | mole % | weight g | source of material |
|------|--------|----------|--------------------|
| $ZrF_4$ | 54.0 | 12.21 | GTE Laboratories |
| $BaF_2$ | 20.0 | 4.74 | MIT Crystal Physics Laboratory |
| $LaF_3$ | 4.5 | 1.19 | Ames Laboratory, Ames, Iowa |
| $AlF_3$ | 3.5 | .396 | EM Chemicals |
| $NaF$ | 15.5 | .879 | Harshaw |
| $InF_3$ | 2.5 | .581 | Spex |
|      | 100.0 | 20.00 g |  |

This composition is a stable (ZBLAN) $ZrF_4$, $BaF_2$, $LaF_3$, $AlF_3$ and $NaF$ glass formulation with the addition of $InF_3$. Also, $HfF_4$ can be substituted for $ZrF_4$ on a mole to mole basis to make a fluorohafnate glass instead of a fluorozirconate glass.

The use of $InF_3$ was previously reported in only three references describing the addition of small amounts of $InF_3$ to ZBLAN, HBLAN, type glasses, and each claimed either improved thermal stability of the glass or reduced light scatter. In all three references, the glass preparations containing $InF_3$ were done with a large amount of ammonium bifluoride so that the role of $InF_3$ as an oxidant was masked. In no case was it reported that ZBLAN glasses containing $InF_3$ were made, or even could be made, without RAP or without ammonium bifluoride, as we are now doing routinely in our new and improved process.

The second key element of this new process is the need to keep water out of the materials. An approach was the exhaustive evacuation of the batch starting materials by a liquid nitrogen trapped diffusion pump/fore pump or a cryopump system while the furnace was being warmed. The furnace was repeatedly pumped and refilled with Ar which has been passed over a titanium getter to remove both oxygen and water. This procedure very effectively dried the batch materials and the interior furnace elements prior to melting.

The complete procedure we used is as follows:

High purity fluoride starting materials stored in a Vacuum/Atmospheres argon atmosphere glove box with less than 1 ppm $O_2$ and 1 ppm $H_2O$ were weighed and mixed in the box in 20 g batches. The batched components were transferred to a vitreous carbon crucible which was placed into a custom Centorr furnace with a graphite resistance heated element attached directly to the glove box. The furnace was heated to 200° C. and repeatedly evacuated to $2 \times 10^{-5}$ torr or $2 \times 10^{-6}$ torr with a cryopump and refilled with titanium gettered argon ($10^{-20}$ bar $O_2$ and $H_2O$) to drive off any water absorbed on the batch components or furnace elements. The glass was melted at 835° C., cast at 700° C. into a nickel or stainless steel mold, and annealed at 260° C. just below the glass transition temperature, all operations taking place in the glove box.

Fourteen ZBLAN glasses were prepared using this procedure. In eleven glasses, $InF_3$ was included and in these cases the resultant glass was clear and free of reduced zirconium. The three glasses prepared without InF$_3$ were severely degraded in appearance with substantial dark, opaque regions signalling the presence of reduced zirconium.

In addition, we found that the substitution of 1 mol % SnF$_4$ for the 2.5 mole % InF$_3$ to be highly successful in making clear optical glass. When the 1 mole % SnF$_4$ was added instead of 2.5 mole % InF$_3$ the BaF$_2$ was increased from 20.0 mole percent to 21.5 mole percent without degrading the glass.

Additional samples were made with the following formulations:

| Materials | Samples | | | | | |
| Mole % | 92 | 93 | 94 | 95 | 96 | 97 |
| --- | --- | --- | --- | --- | --- | --- |
| ZrF$_4$ | 54.0 | 54.0 | 54.0 | 54.0 | 54.0 | 54.0 |
| BaF$_2$ | 21.0 | 21.0 | 21.0 | 21.0 | 21.0 | 21.0 |
| LaF$_3$ | 4.5 | 4.5 | 4.5 | 4.5 | 4.5 | 4.5 |
| AlF$_3$ | 3.5 | 3.5 | 3.5 | 3.5 | 3.5 | 3.5 |
| NaF | 16.50 | 16.90 | 16.75 | 16.90 | 16.95 | 16.98 |
| InF$_3$ | 0.50 | 0.10 | 0.25 | — | — | — |
| SnF$_4$ | — | — | — | 0.10 | 0.05 | 0.02 |

The raw material samples 92, 93, 94, 95, 96, and 97 were prepared as follows: Thirty grams of the materials were heated in a 50 cc vitreous carbon crucible after an initial cold evacuation of at least 16 hours. The first step involved heating the materials for at least 3 hours at about 200° C. under vacuum until a pressure of $2 \times 10^{-6}$ torr or better was reached. The chamber was then filled with gettered argon and the heating was continued. The crucible was kept 825° C. for 30 minutes, cooled to 700° C. and then taken from the furnace. About ⅓ of the melt was poured from the crucible, designated as melt (a), then cooled to room temperature to form a glass. The resulting glasses were designated 92(a), 93(a), 94(a), 95(a), 96(a), and 97(a). The crucible containing the remaining melt was returned to the furnace and heated to 825° C. for another 60 minutes and then cooled to 700° C. A second third of the melt was poured from the crucible, designated as melt (b), then cooled to room temperature to form a glass. The resulting glasses were designated 92(b), 93(b), 94(b), 95(b), 96(b), and 97(b). The crucible containing the remaining melt was reheated for another 90 minutes and then cooled to 700° C. The remaining melt was then poured from the crucible, designated as melt (c), then cooled to room temperature to form a glass. The resulting glasses were designated 92(c), 93(c), 94(c), 95(c), 95(c), 96(c), and 97(c).

The resulting glasses were visually inspected and the following observations were made: Samples 92(a),(b),(c); 94(a),(b),(c); 95(a),(b),(c) were clear and free of black specks. Samples 93(a),(b),(c) had black specks in the glass. Samples 96(a).(b),(c) had a trace of black specks. Samples 97(a),(b) had some black specks and sample 97(c) had more black specks than samples 97(a) and 97(b).

In summary, it is a combination of high purity essentially water free starting materials and the presence of a nonvolatile metallic oxidant which permits the preparation of high optical quality ZrF$_4$ or HfF$_4$ based glasses without the need of NH$_4$F.HF and/or RAP processing.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method for preparing an optically clear fluoride glass comprising the following steps:

Step 1—melting in an atmosphere of inert gas a water free mixture consisting essentially of an in situ oxidant consisting of a nonvolatile metal fluoride consisting of SnF$_4$ and high purity starting materials for a fluorozirconate optical glass, wherein the amount of said SnF$_4$ oxidant in the mixture is sufficient to substantially prevent the reduction in oxidation state of zirconium during the melting of the mixture and said SnF$_4$ oxidant does in fact prevent said reduction during said melting, wherein Step 2—cooling the product of Step 1 to form an optically clear fluorozirconate fluoride glass.

2. A method in accordance with claim 1 wherein said SnF$_4$ is greater than 0.05 mole percent of said mixture.

3. A method in accordance with claim 1 wherein said SnF$_4$ is equal to or greater than 0.1 mole percent of said mixture.

4. A method in accordance with claim 1 wherein said SnF$_4$ is about 0.1 mole percent to about 1.0 mole percent of said mixture.

5. A method in accordance with claim 1 wherein said SnF$_4$ is about 1.0 mole percent of said mixture.

6. A method in accordance with claim 5 wherein said high purity essentially water free starting materials for a fluorozirconate optical glass consists essentially, expressed in mole percent, about 54.0 m/o of ZrF$_4$, about 21.5 m/o BaF$_2$, about 4.5 m/o LaF$_3$, about 3.5 m/o AlF$_3$, and about 15.5 m/o NaF of said mixture.

7. A method according to claim 1 further comprising the step before Step 1 of mixing the in situ oxidant in essentially water free form with the high purity starting materials in essentially water free form to form the mixture.

8. A method for preparing an optically clear fluoride glass comprising the following steps:

Step 1—melting in an atmosphere of inert gas a water free mixture consisting essentially of an in situ oxidant consisting of a nonvolatile metal fluoride consisting of SnF$_4$ and high purity starting materials for a fluorohafnate optical glass, wherein the amount of said SnF$_4$ oxidant in the mixture is sufficient to substantially prevent the reduction in oxidation state of zirconium during the melting of the mixture and said SnF$_4$ oxidant does in fact prevent said reduction during said melting, wherein the melting takes place without reactive atmosphere processing or the inclusion of NH$_4$F.HF in the mixture; and Step 2—cooling the product of Step 1 to form an optically clear fluorohafnate fluoride glass.

9. A method in accordance with claim 8 wherein said SnF$_4$ is greater than 0.05 mole percent of said mixture.

10. A method in accordance with claim 8 wherein said SnF$_4$ is equal to or greater than 0.1 mole percent of said mixture.

11. A method in accordance with claim 8 wherein said SnF$_4$ is about 0.1 mole percent to about 1.0 mole percent of said mixture.

12. A method in accordance with claim 8 wherein said SnF$_4$ is about 0.1 mole percent of said mixture.

13. A method in accordance with claim 12 wherein said high purity essentially water free starting materials for a fluorohafnate optical glass consists essentially, expressed in mole percent, about 54.0 m/o of ZrF$_4$, about 21.5 m/o BaF$_2$, about 4.5 m/o LaF$_3$, about 3.5 m/o AlF$_3$, and about 15.5 m/o NaF of said mixture.

14. A method according to claim 8 further comprising the step before Step 1 of mixing the in situ oxidant in essentially water free form with the high purity starting materials in essentially water free form to form the mixture.

* * * * *